Dec. 25, 1928.  1,696,732
O. K. RICHARD ET AL
WHEEL ANCHORING DEVICE
Filed April 3, 1925
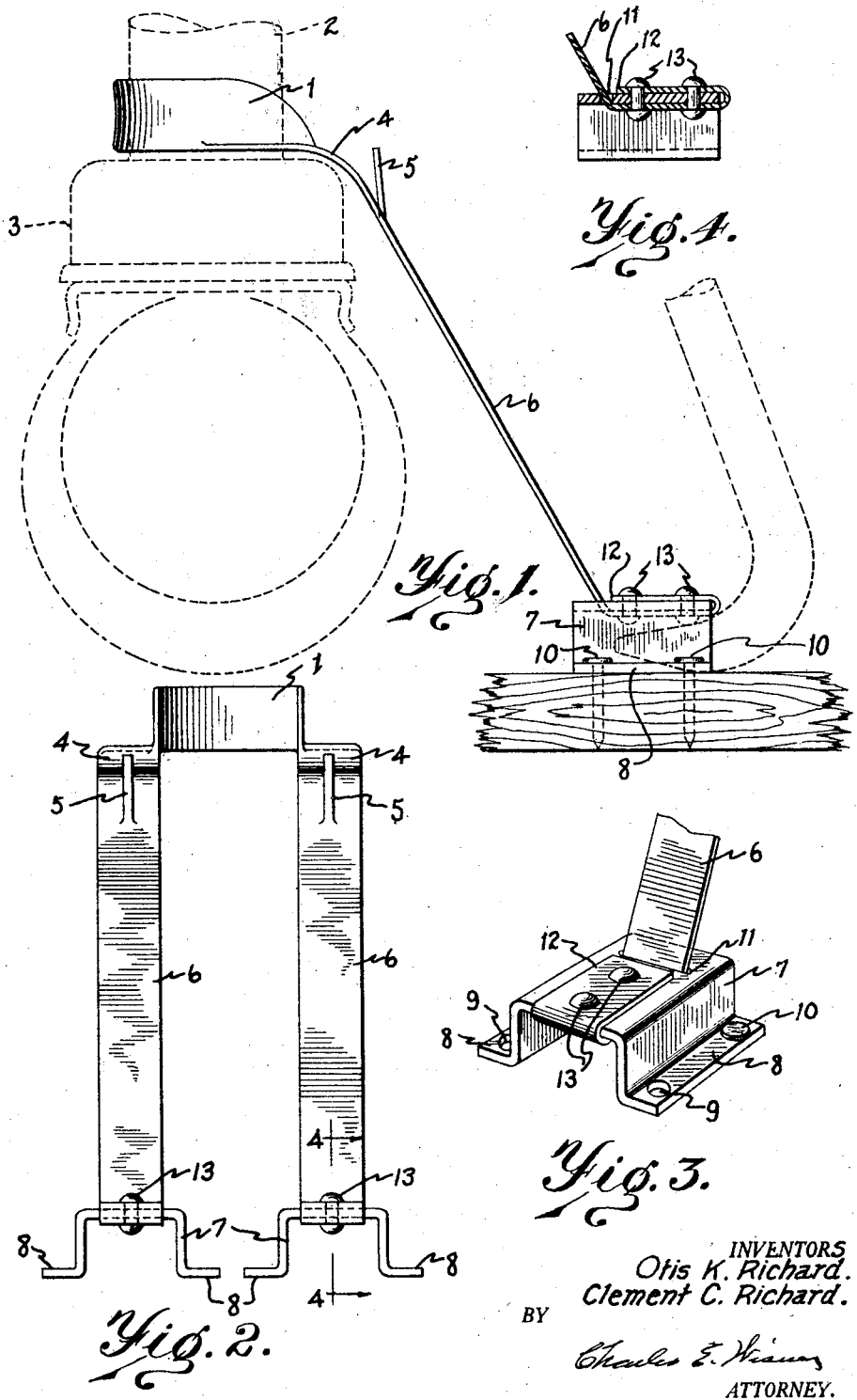
INVENTORS
Otis K. Richard.
Clement C. Richard.
BY
Charles E. Wise
ATTORNEY.

Patented Dec. 25, 1928.

1,696,732

UNITED STATES PATENT OFFICE.

OTIS K. RICHARD AND CLEMENT C. RICHARD, OF DETROIT, MICHIGAN.

WHEEL-ANCHORING DEVICE.

Application filed April 3, 1925. Serial No. 20,339.

This invention relates to wheel anchoring devices and the object of the invention is to provide a wheel anchoring device for securing automobiles for shipment to prevent movement thereof. Another object of the invention is to provide a wheel anchoring device adapted to grip a spoke of each wheel of a vehicle and secure the same solidly to the floor of a freight car in which the vehicle is shipped. A further object of the invention is to provide a wheel anchoring device of the character described which may be easily attached to the wheel spokes and to the supporting floor. A still further object of the invention is to provide a wheel anchoring device which when used in combination with blocks for blocking the vehicle wheels prevents movement of the vehicle or wheels in any and all directions. Another object of the invention is to provide a wheel anchoring device provided with feet for securing the same to a freight car floor, the said feet being so formed as to be easily removed from the freight car floor after the shipment has reached its destination. Another object of the invention is to provide a securing foot for a wheel anchoring device in which the device may be easily secured to a floor and which will not easily pull up but which may be easily removed from the floor with the proper tool. These objects and the several novel features of the invention are hereinafter more fully described and claimed and the preferred form of construction by which these objects are attained is shown in the accompanying drawings in which—

Fig. 1 is a side elevation of a wheel anchoring device embodying our invention.

Fig. 2 is a front elevation thereof.

Fig. 3 is a perspective view of one of the securing feet.

Fig. 4 is a longitudinal section through one of the securing feet.

As shown in Figs. 1 and 2 the device is made of strap iron and consists of a portion 1 which is bent to a U shape to fit about the spoke 2 of a wheel. The legs of the device are bent up at right angles to the sides of the U shaped portions and the legs are bent to provide a shoulder 4 which fits over the felloe 3 of the wheel. Each leg 6 is provided with a lug 5 struck up from the body thereof and the portion 1 of the device including the bend 4 is preferably wound with cloth padding and the ends of the said padding are secured in place by clinching the lugs 5 thereover. This padding protects the spokes and felloe from being scratched and allows the device to be drawn into tight engagement with the wheel. Each leg 6 of the device is provided with a foot as shown more particularly in Fig. 3 comprising an inverted U shaped portion 7 having a flange 8 on each side provided with apertures 9 through which nails 10 may be inserted to secure the device to a floor. A slot 11 is provided in the upper face of the portion 7 and the leg 6 is inserted through the slot 11 and the end 12 thereof is turned up over the portion 7 of the foot. A pair of rivets 13 are then secured to the return bent ends of the leg 6 and through the portion 7 of the foot. In this manner the legs of the device are solidly secured to the feet and cannot come apart. When the automobiles are shipped in a freight car the wheels are blocked and the device is applied as shown in Fig. 1 to securely hold each wheel in position in the blocks. When the freight car has reached its destination it is necessary to remove the anchoring device so that the automobiles may be unloaded from the freight car and the feet are made in the peculiar form shown in Fig. 3 to allow easy removal of the device and at the same time provide a strong securing foot. To remove the device a crow bar or hook member, as shown in Fig. 1, is inserted beneath the inverted U shaped portion 7 of the foot and by applying pressure the foot and nails are torn loose from the flooring of the freight car. Thus the device may be easily removed and the freight car floor is not particularly injured by use of the device. When the foot plates are made flat it is often necessary to dig into the floor of the freight car with the crow bar in order to remove the plate and after the freight car has been used a few times for this purpose the floors become badly dug up with the result that the freight car owners object to the use of such a device. However, with the device shown in the drawing this objection is overcome as there is no necessity of digging or marking the floor in removing the device with the exception of the four nail holes formed for each foot but which are not objected to.

From the foregoing description it becomes evident that the device is very simple and efficient in operation, may be easily secured to or removed from a floor, is of strong and rugged construction, and provides a device which accomplishes the objects described.

Having thus fully described our invention, its utility and mode of operation, what we claim and desire to secure by Letters Patent of the United States is—

1. A wheel anchoring device comprising a strip of metal bent to U form adapted to engage about the spoke of a wheel and with the legs extending downwardly therefrom in spaced relation and a foot member for each leg consisting of an inverted U shaped metal member having apertured side flanges adapted for attachment to a wheel supporting surface, the ends of the legs being permanently and rigidly attached to the higher portion of the respective foot members providing a clear space therebetween for introduction of a detaching implement.

2. A wheel anchoring device comprising a strap iron bent to a U-shape in its midsection providing a collar to engage about a spoke of the wheel and legs extending outwardly therefrom, and a pair of foot portions each comprising a sheet metal plate bent to substantially U-form with apertured outwardly extending side flanges for attachment to a wheel supporting surface the high point of the U portion having a slot and the ends of the legs being inserted through the slot and return bent over the upper face of the respective plate providing an unobstructed space therebeneath for introduction of a detaching implement, and a rivet extending through the return bent end, the plate, and portion of the leg therebeneath.

3. A wheel anchoring device comprising in a unitary structure a wheel engaging portion and means for attachment thereof to a wheel supporting surface, the wheel engaging portion consisting of a metal strap bent to U form in its midsection to engage about the spoke of a wheel and a foot member for each leg consisting of a metal plate having an apertured flange for nailing to a wheel supporting surface, and a raised portion therebetween to which the end of the respective leg is rigidly and permanently attached.

In testimony whereof we sign this specification.

OTIS K. RICHARD.
CLEMENT C. RICHARD.